(12) United States Patent
Boris et al.

(10) Patent No.: US 6,403,951 B1
(45) Date of Patent: Jun. 11, 2002

(54) DETECTION MODULE AND POSITIONING, HOLDING OR GRIPPING DEVICE FOR A PIECE OF AUTOMOBILE BODY WORK

(75) Inventors: Jean-Mathieu Boris, Paris; Fabrice Roudier, Juziers, both of (FR)

(73) Assignee: Genus Technologies, Chatillon (FR)

( * ) Notice: Subject to any disclaimer, the term of this patent is extended or adjusted under 35 U.S.C. 154(b) by 0 days.

(21) Appl. No.: 09/456,882

(22) Filed: Dec. 8, 1999

(30) Foreign Application Priority Data

Dec. 9, 1998 (FR) .............................. 98 15515

(51) Int. Cl.[7] .............................. H01J 40/14; H01J 5/02; G01N 21/86; G01V 8/00; B25J 19/00
(52) U.S. Cl. ............. 250/239; 250/559.12; 250/559.33; 901/47
(58) Field of Search ................. 250/239, 216, 250/227.11, 559.12; 901/35, 47

(56) References Cited

U.S. PATENT DOCUMENTS 4,620,091 A * 10/1986 Zebisch ............... 250/231 SE
5,075,543 A * 12/1991 Courtney ................ 250/223 R
5,177,357 A * 1/1993 Yamaguchi et al. ... 250/231.16
5,222,164 A * 6/1993 Bass, Sr. et al. ............... 385/14
5,567,953 A * 10/1996 Horinouchi et al. ........ 250/551
5,672,884 A * 9/1997 Muehleck et al. .......... 250/551

FOREIGN PATENT DOCUMENTS

| DE | 44 39 838 | 5/1996 |
| EP | 0 484 877 | 5/1992 |
| FR | 2 538 563 | 6/1984 |
| JP | 61-022284 | 1/1986 |

* cited by examiner

*Primary Examiner*—Stephone Allen
*Assistant Examiner*—Eric Spears
(74) *Attorney, Agent, or Firm*—Young & Thompson

(57) ABSTRACT

A device for positioning, holding or gripping pieces of automobile body work, includes a body having a slot permitting the passage of a target or a flag to be detected. The body is provided with a detection module having at least two optical transmission detectors to detect the position of a target or flag and the slot has a width less than the width of transmission of the optical detector.

11 Claims, 1 Drawing Sheet

DETECTION MODULE AND POSITIONING, HOLDING OR GRIPPING DEVICE FOR A PIECE OF AUTOMOBILE BODY WORK

BACKGROUND OF THE INVENTION

The invention relates to a detection module, particularly for a positioning, holding or gripping device for a piece of automobile body work.

The invention also relates to a device for positioning, holding or gripping a piece of automobile body work, provided with a detection module according to the invention.

DESCRIPTION OF THE RELATED ART

Positioning, holding or gripping devices for a piece of automobile body work are used in automobile production: among these devices, are found particularly grips, guide holders or other holding members.

Conventionally, the detection of the position of the known devices takes place with inductive detector means supplying a signal indicating the condition or the position of the device.

The use in automotive production of improved welding stations and robotics, in particular for the assembly of sheet metal automobile body work, leads to the reduction of high intensity magnetic fields which are ultimately adapted to prevent the good operation of the conductive detectors.

SUMMARY OF THE INVENTION

The invention has for its object to overcome these drawbacks, by providing a new detection module insensitive to magnetic fields, of simple and economical construction, whilst permitting reliable connection to a programmable computer or a control center.

The invention has for its object a device for positioning, holding or gripping automobile body work pieces, of the type comprising at least two position detectors, characterized in that each detector is an optical transmission detector.

According to other characteristics of the invention:

- each optical transmission detector is a forked detector comprising one branch with an optical emitter and one branch with an optical receiver,
- each optical transmission detector is an infrared radiation detector,
- the module comprises a housing carrying at least two forked detectors.

The invention also has for its object a device provided with a module according to the invention, characterize in that the detection module is mounted within the body of the device facing a slot for passage of a target or a flag to be detected.

According to other characteristics of the invention:

- said slot has a width less than the transmission width of the optical detector,
- when the body is assembled from two half bodies, the module is mounted in recesses provided each in one half body,
- when the body is constituted by machining from a single block, the module is mounted in a recess of the body adapted to be closed by a cover,
- the detection module can also have a shape adapted to close the body of the device in a substantially sealed manner.

BRIEF DESCRIPTION OF THE DRAWINGS

The invention will be better understood from the description which follows, given by way of non-limiting example with reference to the accompanying drawings, in which.

DESCRIPTION OF THE PREFERRED EMBODIMENTS

Figure 1:
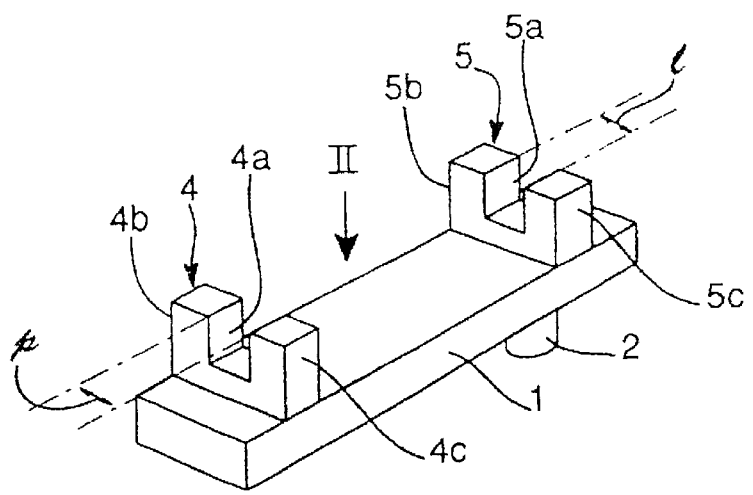
FIG. 1 shows schematically a perspective view in the direction of the arrow I of FIG. 2, of a detection module according to the invention.
Figure 2:
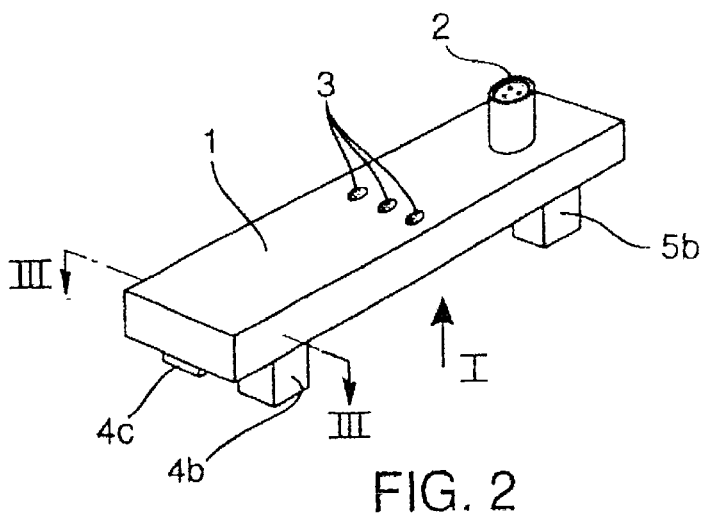
FIG. 2 shows schematically a perspective view in the direction of the arrow II of FIG. 1, of a detection module according to the invention.

With reference to FIGS. 1 and 2, a detection module according to the invention comprises a housing 1 containing an electronic card of small dimension permitting the transmission by means of a connector 2 to three signal contacts representing the condition of the device to a programmable computer or a control center (not shown). The housing 1 can carry three electroluminescent diodes 3 supplying a visual indication of the condition of the device.

A housing 1 has two optical transmission detectors 4 and 5. The optical transmission detectors 4 and 5 each have an optical emitter 4a, 5a emitting a light beam directed toward a facing optical detector. The width l of transmission of the optical detector is determined by its construction, whilst the depth p of penetration of a target or a flag to be detected is also determined by its construction.

Preferably, each optical transmission detector 4, 5 is a forked detector comprising a branch 4b, 5b with an optical emitter 4a, 5a and another branch 4c, 5c carrying an optical receptor.

Thus, during passage of an optical element producing an interruption of the light beam produced by the optical emitter 4a or 5a, the introduction of the light beam gives rise to a signal indicating the position of the device on which is mounted the detection module.

Preferably, each optical transmission detector 4, 5 is an infrared radiation detector, it being understood that any wavelength of radiation can be used in the scope of the present invention, this wavelength could be located in the visible range or invisible range.

Although the transmission of the signal has been described in this example by means of connector 2 mounted securely on the casing 1, the invention also extends to any mode of signal transmission, by means of a cable entering the box 1, or by any other means of wire or wireless connection.

Transmission by optical fiber, also serving as the emitter element or the receiving element, can thus be envisaged without departing from the scope of the present invention.

Figure 3:
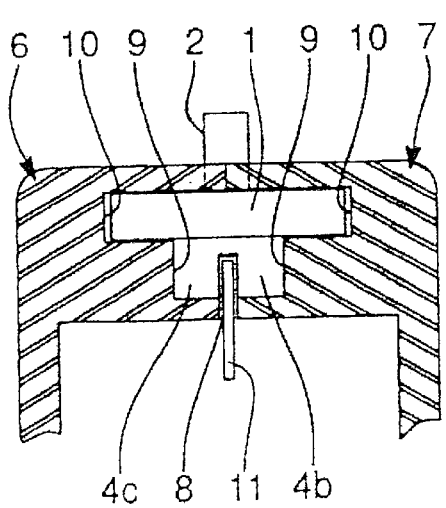
FIG. 3 shows schematically a fragmentary cross-sectional view of a mounting of a detection module seen on the line III—III of FIG. 2, in a device according to the invention.

With reference to FIG. 3, a detection module according to the invention comprising a housing 1 and two branches 4b, 4c is mounted in a gripping device comprising a body assembled from two half bodies 6, 7. Preferably, the half bodies 6, 7 are symmetrical and have machining adapted to constitute on the one hand a slot 8 and recesses 9, 10.

The slot 8 is suitable for the passage of flag 11 or detection target adapted to pass between the branches 4b, 4c of the forked optical detector 4 to interrupt the light beam and to provide a position signal to a programmable computer or a control center (not shown). Generally, the flag 11 or target is connected to a movable device for actuating a gripping arm or holding means or equivalent position.

Because of the trapping of the housing 1 in the recesses 10 and the detectors 4 and 5 in the recesses 9, the detection module according to the invention is completely protected by this mounting such that all that protrudes is the connector 2, windows being if desired provided to permit observing the condition of the electroluminescent diodes 3 if these are present.

Figure 4:
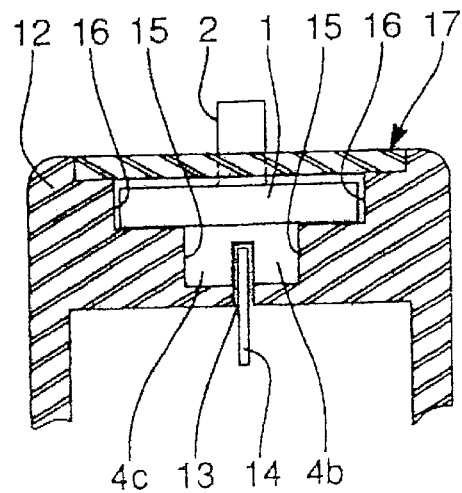
FIG. 4 shows schematically a fragmentary cross-sectional view of a mounting of a detection module seen on the line III—III of FIG. 2, in another device according to the invention.

Referring to FIG. 4, a detection module according to the invention is mounted in a body 12 constituted by machining from a single block. The block 12 comprises a slot 13 permitting the passage of a flag 14 or target connected to a movable device, as well as two recesses 15, 16 to receive respectively the optical transmission detectors 4, 5 and the housing 1.

A cover 17 is preferably provided to protect the detection module according to the invention and to close the body 12. The cover 17 is arranged to permit the transmission of a position signal to a programmable computer or a control center (not shown), for example by being provided with a passage opening for a connector 2.

According to a modification (not shown), the mountings of FIGS. 3 and 4 can be simplified in the case in which the detection module has a shape adapted to close the body of the device in a substantially sealed manner: this modification permits using the housing 1 of the device as a closure cover for a recess provided in one surface of the body of the device, which facilitates mounting, unmounting or exchange and permits moreover a display of position directly on the housing 1 of the device by means of electroluminescent diodes 3 or another indicating means or display means such as for example a liquid crystal display.

Preferably, the width of a slot 8 or 13 is less than the width l of transmission of the optical detector 4 or 5 adjacent to the slot 8 or 13.

The invention described in reference to four particular embodiments is in no way thereby limited, but on the contrary covers any modification of shape and any modification of embodiment within the scope and spirit of the invention.

What is claimed is:

1. Positioning device for holding or gripping pieces of automobile body work, comprising a body (6–7, 12) having a slot (8) permitting the passage of a target or a flag (11, 14) to be detected, the body (6–7, 12) having a detection module comprising at least two optical transmission detectors (4, 5) to detect the position of a said target or flag (11, 14), said detectors having a width (l) of transmission, said slot (8, 13) having a width less than said width (l) of transmission, the body adapted and arranged for attachment to a device for holding positioning, or gripping a piece of automotive body work.

2. Device according to claim 1, in which the body is assembled from two half bodies (6, 7), the module being mounted in recesses (9, 10) provided each within one half (6 or 7) of said body.

3. Device according to claim 1, in which the body (12) is constituted by machining from a single block, the module being mounted in a recess (15–16) of the body (12) closed by a cover (17).

4. Device according to claim 1, wherein the detection module has a shape adapted to close the body (6–7 or 12) of the device in a substantially sealed manner.

5. Device according to claim 1, wherein the module comprises a housing (1) carrying at least two forked detectors (4, 5) and the detection module has a shape adapted to close the body (6–7 or 12) of the device, wherein each of said optical transmission detectors houses one of said optical forked detectors.

6. Device according to claim 1, wherein each optical transmission detector (4 or 5) is a forked detector comprising one branch (4b or 5b) with an optical emitter (4a or 5a) and one branch (4c or 5c) with an optical receiver.

7. Device according to claim 5, wherein each optical transmission detector (4 or 5) is an infrared radiation detector.

8. A device for holding, positioning, or gripping a piece of automotive work, the device comprising:

a gripping device;

a flag attached to a movable device; and a detection module mounted on the gripping device, the detection module including a housing, three electroluminescent diodes visible through an exterior of the housing and supplying a visual indication of the condition of the flag relative to the detection module, and, on one exterior surface of the housing, at least two optical transmission detectors made up of an optical emitter directed to an optical detector, each optical detector including a slot defined by a space between the optical emitter and the optical detector, the slot being sufficient to accept therein the flag.

9. The device of claim 8, wherein the gripping device comprises a body assembled from two half bodies.

10. The device of claim 8, wherein the gripping device comprises a machined single block body closed by a cover.

11. A device for holding, positioning, or gripping a piece of automotive work, the device comprising:

a gripping device supporting a detection module; and a flag attached to a movable device;

the detection module including a housing having mounted on one exterior surface two forked optical transmission detectors, each of the optical forked transmission detectors being made up of an optical emitter directed toward an optical detector, each optical detector including a slot defined by a space between the optical emitter and the optical detector, the slot being sufficient to accept therein the flag, and three electroluminescent diodes, visible from an exterior of the housing, for supplying a visual indication of the condition of the flag relative to the slot.

* * * * *